(12) United States Patent
Ootsuki et al.

(10) Patent No.: US 7,582,035 B2
(45) Date of Patent: Sep. 1, 2009

(54) AUTOMATIC TRANSMISSION

(75) Inventors: Takeshi Ootsuki, Hakinan (JP); Akira Fukatsu, Anjo (JP); Mikio Iwase, Anjo (JP); Kazutoshi Nozaki, Aichi-ken (JP); Atsushi Honda, Seto (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 305 days.

(21) Appl. No.: 11/605,280

(22) Filed: Nov. 29, 2006

(65) Prior Publication Data
US 2007/0135259 A1     Jun. 14, 2007

(30) Foreign Application Priority Data
Nov. 30, 2005  (JP) .............................. 2005-347290

(51) Int. Cl.
*F16H 31/00* (2006.01)
(52) U.S. Cl. ...................................................... 475/121
(58) Field of Classification Search ................. 477/127, 477/128, 130, 143; 475/120, 121, 127, 128, 475/131
See application file for complete search history.

(56) References Cited
U.S. PATENT DOCUMENTS
4,308,764 A * 1/1982 Kawamoto et al. .......... 477/131
5,588,927 A * 12/1996 Tsukamoto et al. ......... 475/128
5,674,154 A * 10/1997 Tsukamoto et al. ......... 477/131
6,027,427 A *  2/2000 Yoo ............................ 477/130
6,302,822 B1 * 10/2001 Suzuki et al. ............... 477/143
6,843,754 B2 *  1/2005 Mori et al. .................... 477/92
7,331,902 B2 *  2/2008 Runde ......................... 477/117

FOREIGN PATENT DOCUMENTS
| JP | 55-142153 | 11/1980 |
| JP | 4300452 A | 10/1992 |
| JP | 05-099301 | 4/1993 |
| JP | 10-141488 | 5/1998 |
| JP | 2001-182785 | 7/2001 |

* cited by examiner

*Primary Examiner*—Roger Pang
*Assistant Examiner*—Justin Holmes
(74) *Attorney, Agent, or Firm*—Bacon & Thomas, PLLC

(57) ABSTRACT

An automatic transmission is capable of shifting between multiple speeds by engaging and disengaging multiple frictional engagement devices including at least one clutch and one brake, and is capable of switching between a driving range and a non-driving range with operation of a shift lever, wherein a first brake is engaged to fix an intermediate rotary member to a transmission case in a non-driving range such as neutral range. Thus, rotation of a clutch from drag torque can be stopped and shock due to engagement of a brake can be prevented by engagement of the first brake in the non-driving range.

9 Claims, 4 Drawing Sheets

FIG. 3

|       | C-1 | C-2 | C-3 | C-4 | B-1 | B-2 | F-1 |
|-------|-----|-----|-----|-----|-----|-----|-----|
| P     |     |     |     |     |     |     |     |
| REV1  |     |     | O   |     |     | O   |     |
| REV2  |     |     |     | O   |     | O   |     |
| N     |     |     |     |     |     |     |     |
| 1ST   | O   |     |     |     |     | (O) | O   |
| 2ND   | O   |     |     |     | O   |     |     |
| 3RD   | O   |     | O   |     |     |     |     |
| 4TH   | O   |     |     | O   |     |     |     |
| 5TH   | O   | O   |     |     |     |     |     |
| 6TH   |     | O   |     | O   |     |     |     |
| 7TH   |     | O   | O   |     |     |     |     |
| 8TH   |     | O   |     |     | O   |     |     |

AUTOMATIC TRANSMISSION

INCORPORATION BY REFERENCE

The disclosure of Japanese Patent Application No. 2005-347290 filed on Nov. 30, 2005, including the specification, drawings and abstract thereof, is incorporated herein by reference in its entirety.

BACKGROUND OF THE INVENTION

1. Field of the Invention

The present invention relates to an automatic transmission wherein rotation of a clutch from drag torque can be stopped by operation of a brake in neutral.

2. Description of the Related Art

The automation transmission depicted in FIG. 2 of Japanese Unexamined Patent Application Publication ("Kokai") NO. 2001-182785 provides eight speeds ("gears" or "gear ratios"), and includes an input rotary member which is continuously rotated by an engine even while the transmission is in neutral, and that continuous rotation is transmitted to one of the sets of frictional engagement elements (clutch plates) of a third clutch C3 and a fourth clutch C4 via a first planetary gear set G1. Therefore, drag torque is generated between the clutch plates and the clutch discs, interleafed therewith and linked to a first shaft J1 (intermediate rotary member), whereby the clutch and the first shaft J1 are rotated at the rotational speed Nd by this drag torque.

In shifting from the above-described neutral state into reverse by controlling the rotation of the first shaft J1 with application of brake pressure, while holding a second shaft element J2 in a fixed state, a sun gear S2 of a Ravigneaux-type gear unit G23 is rotated by the drag torque. Since a third shaft J3 is fixed by the vehicle brake, the braking of carriers PC2 and PC3 while a ring gear R2 is fixed, causes the output torque Tout to fluctuate, whereby shift shock is generated to the discomfort of the driver.

SUMMARY OF THE INVENTION

Accordingly, it is an object of the present invention to solve the above-described problems by providing an automatic transmission wherein rotation of a clutch due to drag torque can be stopped by operation of a brake in neutral.

An automatic transmission, according to a first aspect of the present invention, comprises an intermediate rotary member which is selectively connected to a rotary member continuously rotated by the engine, via a first clutch, and which is selectively fixed to the transmission case via a first brake; wherein shifting between multiple speeds(gear ratios) by the selective engaging and releasing of multiple frictional engagement elements, including at least the first clutch and first brake. The automatic transmission can be switched between a driving range and a non-driving range by operation of a shift lever, and the first brake is engaged and the intermediate rotary member is fixed to the transmission case in the non-driving range.

Thus, by fixing the intermediate rotary member with the first brake engaged in a non-driving range, e.g. the neutral range, the brake can be engaged in a state wherein the intermediate rotary member is stopped, while in transition to reverse and so forth, and thus change in rotation of the rotary elements of the transmission mechanism can be prevented in shifting from neutral to reverse, thus reliably preventing shock.

The oil pressure required to engage the first brake in the non-driving range is lower than the operating oil pressure required to engage the first brake in the driving range.

Thus, by utilizing an operating oil pressure for the first brake in a non-driving range lower than that utilized a forward drive range, discharge of the operating oil pressure of the first brake can be performed quickly in transition from neutral to the driving range, and thus engagement of the frictional elements necessary for establishing the driving range can be performed quickly.

The operating oil pressure of the first brake in the non-driving range may be the minimum required to fix the intermediate rotary member to the transmission case.

Thus, the operating oil pressure of the first brake in a non-driving range is the minimum oil pressure required to fix the intermediate rotary member to the transmission case, and therefore discharge of the operating oil pressure of the first brake can be effected in the shortest possible time.

Optionally, the automatic transmission may further comprise: an input rotary member; an input rotation detecting sensor for detecting the rotational speed of the input rotary member; an output rotary member; an output rotation detecting sensor for detecting the rotational speed of the output rotary member; and a rotation detecting sensor for detecting the rotational speed of the intermediate rotary member.

Thus, the automatic transmission has an input rotation sensor for detecting the speed of rotation of the input rotary member, an output rotation sensor for detecting the speed of rotation of the output rotary member, and an intermediate rotation sensor for detecting the speed of rotation of the intermediate rotary member, and therefore the rotational speed of the intermediate rotary member can be independently detected in a reliable manner.

The multiple frictional engagement elements may further comprise a second brake which is different from the first brake, wherein the non-driving range is the neutral range, the driving range is the reverse range, and wherein in switchover from the neutral range to the reverse range, the first brake is released, and, in establishing the reverse range, the first clutch and second brake are engaged.

Thus, the first brake (B-1) is released in shifting from neutral range to the reverse range, and the reverse range is established by engagement of a first clutch and a second brake, and therefore, rotational changes within the transmission during shifting from the neutral range to the reverse range are achieved without the occurrence of shift shock.

BRIEF DESCRIPTION OF THE DRAWINGS

FIG. 3 is a chart of brake and clutch states at each speed (gear ratio) of the automatic transmission shown in FIG. 1;

DESCRIPTION OF THE PREFERRED EMBODIMENTS

Figure 1:
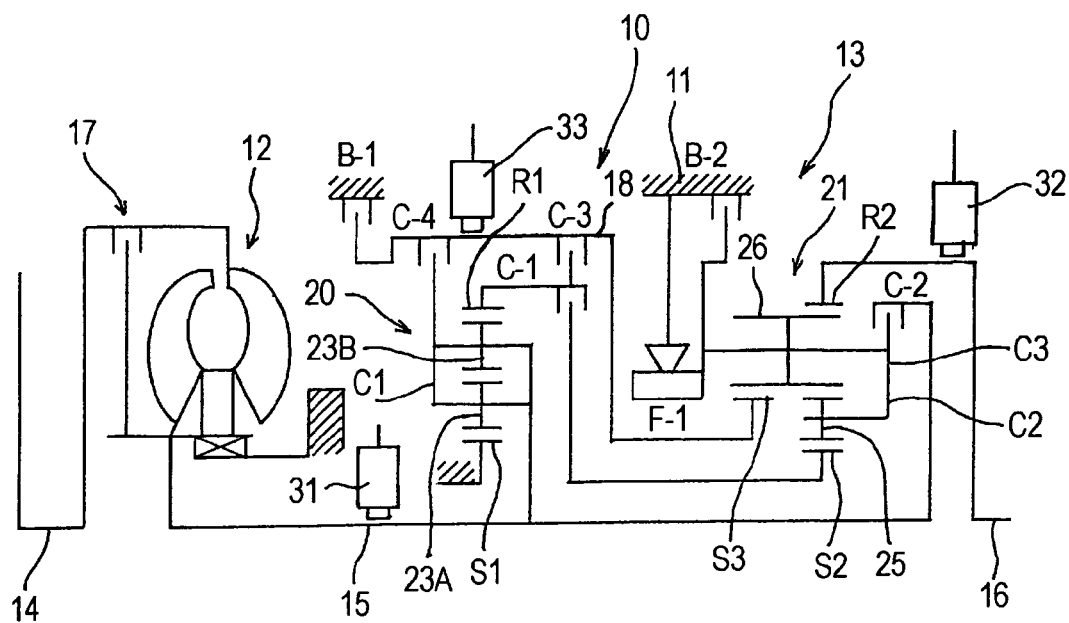
FIG. 1 is a skeletal diagram of one embodiment of an automatic transmission in accordance with the present invention.

Embodiments of the present invention are described below with reference to the drawings. FIG. 1 shows an automatic transmission 10 which is preferred for use in a vehicle of the front engine, rear wheel drive type. The automatic transmission 10 has a torque converter 12 and a transmission mechanism 13 housed within the transmission case 11 which is attached to the vehicle body. Output from the engine is input to an input shaft 15 of the automatic transmission 10 via a pump impeller of the torque converter 12 and a turbine runner. The transmission mechanism 13 changes the speed of the rotation input from the input shaft 15 and outputs the changed speed at an output shaft 16 which is connected to the drive wheels. A lockup clutch 17 is provided within the torque converter 12.

The transmission mechanism 13 comprises the input shaft 15, reduction planetary gear set 20, planetary gear set 21 formed of multiple planetary gear subsets, output shaft 16, first through fourth clutches C-1 through C-4, and first and second brakes B-1 and B-2, which are arranged sequentially and coaxially within the transmission case 11.

The reduction planetary gear set 20, which reduces the speed of rotation of the input shaft 15 and transmits this reduced speed to a reduced speed rotary member, comprises a sun gear S1 which is directly supported on the transmission case 11 and which has its speed of rotation controlled, a carrier C1 linked to the input shaft 15, a first pinion 23A which is supported by the carrier C1 and meshes with the sun gear S1, a second pinion 23B which is supported by the carrier C1 and meshes with the first pinion 23A, and a ring gear R1 which meshes with the second pinion 23B.

The planetary gear set 21 is a Ravigneaux-type gear set, for example, wherein a single pinion planetary gear subset and a double pinion planetary gear subset are combined.

The first sun gear S2 ("small diameter sun gear") of the planetary gear set 21, is selectively connected to the ring gear R1 of the reduction planetary gear set 20 by operation of the first clutch C-1, and the second sun gear S3 "large diameter sun gear" is selectively connected to the ring gear R1 of the reduction planetary gear set 20 by operation the third clutch C-3, and also selectively connected to the input shaft 15 by operation of the fourth clutch C-4, via the carrier C1 of the reduction planetary gear set 20. The short pinion 25 meshes with the first sun gear S2. The long pinion 26 meshes with the second sun gear S3, as well as with the short pinion 25. The short pinion 25 and long pinion 26 are respectively rotationally supported by the carriers C2 and C3. The ring gear R2 meshes with the long pinion 26, and is also connected to the output shaft 16 which serves as the output rotary member.

The second sun gear S3 is selectively fixed to the transmission case 11 by operation of the first brake B-1. The carrier C2 (C3) is selectively connected to the input shaft 15 by operation of the second clutch C-2. Also, the carrier C2 (C3) is selectively fixed to the transmission case 11 by operation of the second brake B-2, and is also selectively limited to rotation in one direction only by operation of one-way clutch F-1.

The automatic transmission 10 is shifted between a forward range serving as a driving range (D range), a reverse range (R range), a parking range serving as a non-driving range (P range), and a neutral range (N range), by operation of the shift lever (not shown).

Figure 2:
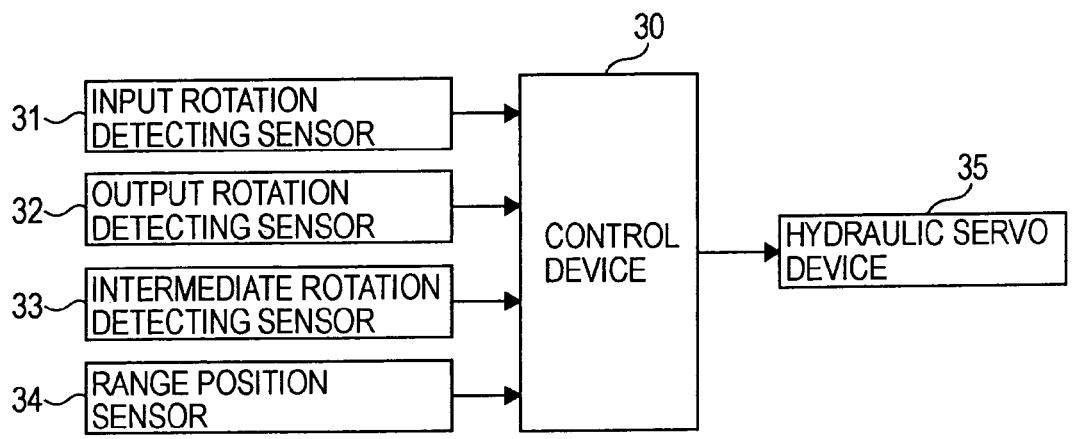
FIG. 2 is a block diagram of an embodiment of a control system utilized in the present invention.

FIG. 2 illustrates a controller for the automatic transmission 10, including a control device 30 having a built-in CPU and which receives, as input, signals from the rotational speed detecting sensor 31, the output rotational speed detecting sensor 32, the intermediate rotational speed detecting sensor 33, and a range position sensor 34 which outputs signals D, N and R responsive to movement of the shift lever. The control device 30 then selects the most appropriate gear ratio based on input of these signals, outputs a control current to the hydraulic servo devices 35 which respectively and selectively engage the first through fourth clutches C-1 through C-4 and the first and second brakes B-1 and B-2 as shown in FIG. 3, to establish eight forward speeds (gear ratios) and two reverse speeds. Note that in FIG. 3, a circle, in the spaces for the clutches and brakes corresponding to the various gear ratios denotes engagement of the clutch or brake, and a blank space denotes that the clutch or brake is released.

The establishment of the various speeds (gear ratios) will be described below. In the P (parking) range and in the N (neutral) range, all of the clutches C-1 through C-4 and brakes B-1 and B-2 are released, and therefore no motive power is transmitted between the input shaft 15 and the output shaft 16.

In the case of the first forward speed, as shown in FIG. 2, the first clutch C-1 and the one-way clutch F-1 are engaged. Thus, the reduced-speed rotation of the ring gear R1 of the reduction planetary gear set 20 is input to the first sun gear S2 of the planetary gear set 21 via the first clutch C-1. Then the reduced speed of the first sun gear S2 is further reduced via the carrier C2 (C3), while the rotation is limited to one direction by the one-way clutch F-1, and is input to the ring gear R2. The output shaft 16 is thereby rotated at the reduced first forward speed. When downshifting, the second brake B-2 is engaged instead of the one-way clutch F-1, and the carrier C2(C3) is fixed against rotation.

In the case of the second forward speed, the first clutch C-1 and the first brake B-1 are engaged. Thus, the reduced-speed rotation of the ring gear R1 of the reduction planetary gear set 20 is input to the first sun gear S2 via the first clutch C-1, and the second sun gear S3 is fixed by the first brake B-1, and thus the ring gear R2, and by extension the output shaft 16, rotate with a gear ratio for output of the second forward speed.

In the case of the third forward speed, the first and third clutches C-1 and C-3 are engaged. Thus, the reduced-speed rotation of the ring gear R1 of the reduction planetary gear set 20 is input to the first sun gear S2 via the first clutch C-1, and is also input to the second sun gear S3 via the third clutch C-3, so that the whole planetary gear set 21 is rotated in unison, and thus the ring gear R2, and by extension the output shaft 16, has a speed of rotation reduced from that of the input shaft 15, which reduced speed is output as third forward speed at the output shaft 16.

In fourth forward speed, the first and fourth clutches C-1 and C-4 are engaged. Thus, the reduced-speed rotation of the ring gear R1 of the reduction planetary gear set 20 is input to the first sun gear S2 via the first clutch C-1, and the rotation of the carrier C1 of the reduction planetary gear set 20 is input into the second sun gear S3 via the fourth clutch C-4. Thus, the ring gear R2, and by extension the output shaft 16, rotate with the gear ratio for the fourth forward speed.

In the case of the fifth forward speed, the first and second clutches C-1 and C-2 are engaged. Thus, the reduced speed rotation of the ring gear R1 of the reduction planetary gear set 20 is input to the first sun gear S2 via the first clutch C-1, and also the rotation of the input shaft 15 is input into the first and second carriers C2 and C3 (which are linked) via the second clutch C-2, and thus the ring gear R2 and the output shaft 16 are rotated in forward with the gear ratio of the fifth speed, whereby the reduced (fifth) speed is output at the output shaft 16.

In the case of the sixth forward speed, the second and fourth clutches C-2 and C-4 are engaged. Thus, the input rotation of the input shaft 15 via the carrier C1 of the reduction planetary gear set 20 is input to the second sun gear S3 via the fourth clutch C-4, and also the rotation of the input shaft 15 is input to the first and second carriers C2 and C3 via the second clutch C-2, so that the whole planetary gear set 21 is rotated as a unit with the input shaft 15, and the output shaft 16 is rotated in forward at the sixth speed.

In the case of the seventh forward speed, the second and third clutches C-2 and C-3 are engaged. Thus, the rotation of the input shaft 15 is input to the first and second carriers C2 and C3 via the second clutch C-2, and also the reduced-speed rotation of the ring gear R1 of the reduction planetary gear set 20 is input into the second sun gear S3 via the third clutch C-3, so that the ring gear R2 and the output shaft 16 are forward-rotated in a gear ratio for the seventh speed, thereby outputting the increased seventh speed at the output shaft 16.

In the eighth forward speed, the second clutch C-2 and the first brake B-1 are engaged. Thus, the rotation of the input shaft 15 is input to the first and second carriers C2 and C3 (which are integral) via the second clutch C-2, and also the second sun gear S3 is fixed by the first brake B-1, so that the ring gear R2, and by extension the output shaft 16, are rotated in forward with a gear ratio for output of the eighth (increased) speed at the output shaft 16.

To establish the first reverse speed, the third clutch C-3 and the second brake B-2 are engaged. Thus, the rotation of the input shaft 15 is input to the second sun gear S3 via the third clutch C-3, and the first and second carriers C2 and C3 are fixed by the second brake B-2. Thus, the ring gear R2 and the output shaft 16 are rotated in reverse with a gear ratio for output of the first reverse speed at the output shaft 16.

For the second reverse speed, the fourth clutch C-4 and the second brake B-2 are engaged. Thus, the rotation of the input shaft via the carrier C1 of the reduction planetary gear set 20 is input to the second sun gear S3 via the fourth clutch C-4, and the first and second carriers C2 and C3 are fixed by the second brake B-2, so that the ring gear R2, and by extension the output shaft 16, are rotated in reverse in a gear ratio for output of the second reverse speed at the output shaft 16.

Figure 4:
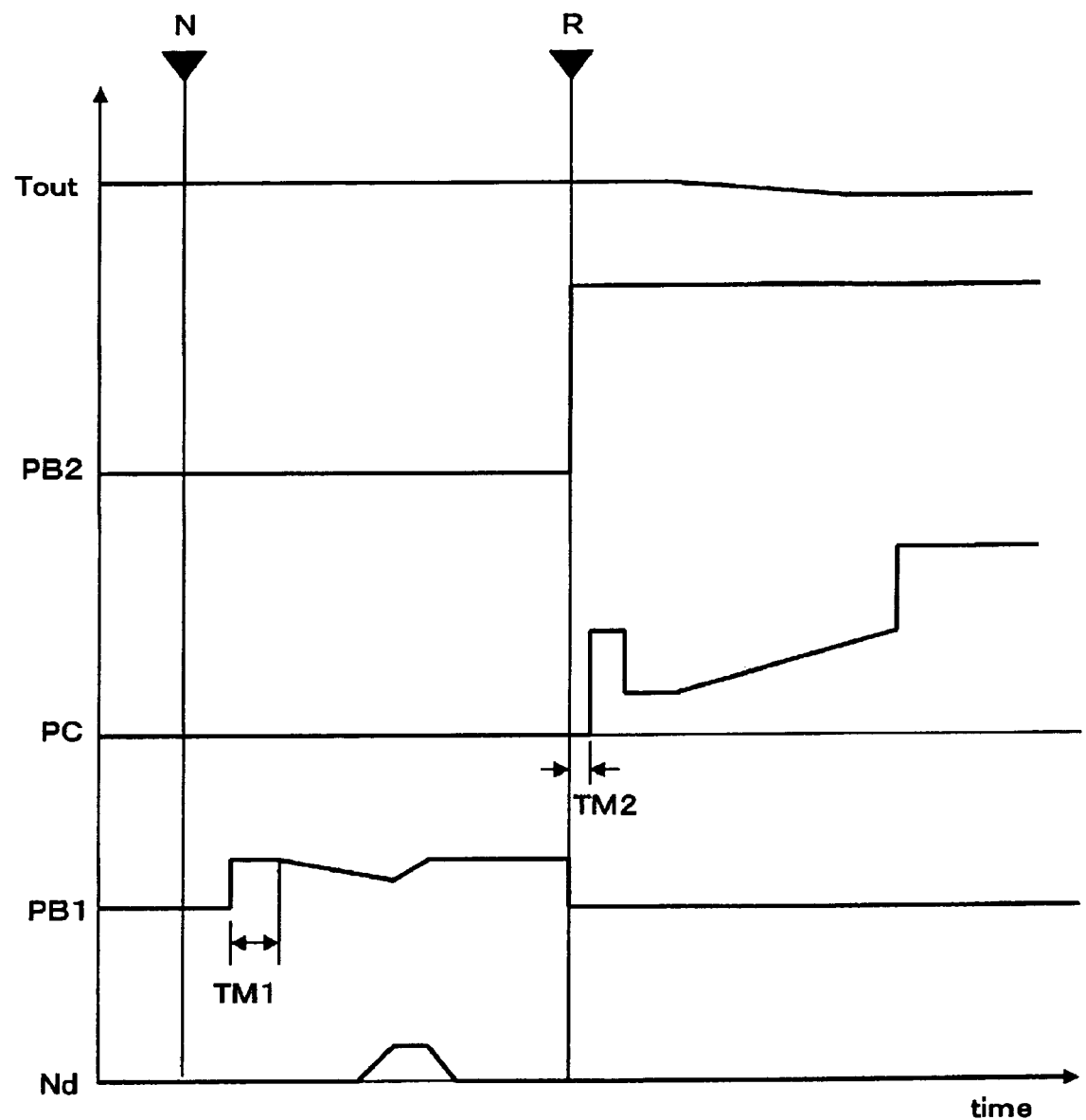
FIG. 4 is a timing diagram for operation of the automatic transmission according to an embodiment of the present invention.
Figure 5:
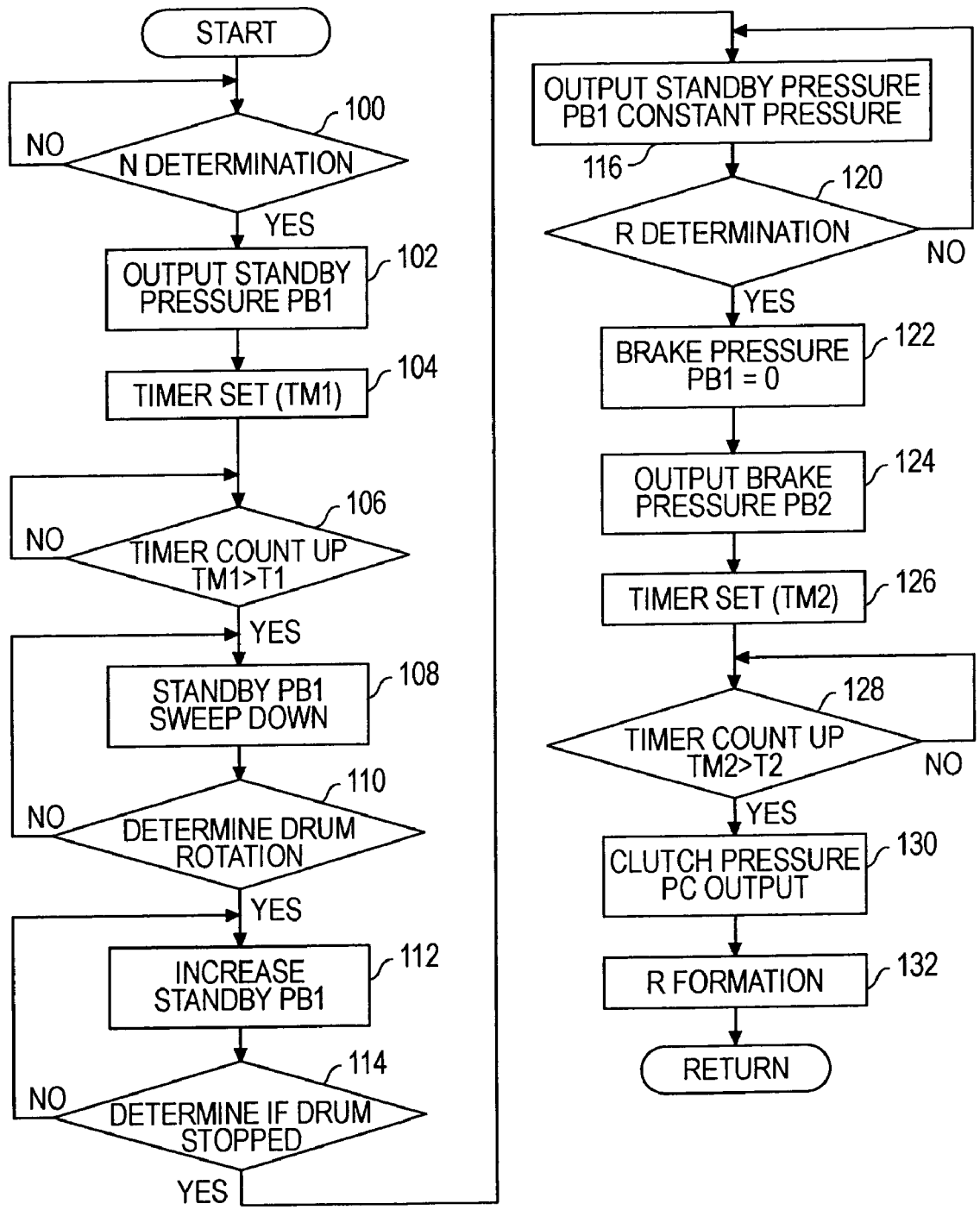
FIG. 5 is a flow chart of operation of an automatic transmission according to an embodiment of the present invention.

FIG. 4 is a timing chart for brake pressure control in neutral, and FIG. 5 is a flow chart for executing the brake pressure control. The timing chart will be described below, along with the flow chart. For the switchover from the neutral range (N) to the reverse range (R), the second brake B-2 and the third clutch C-3 or the fourth clutch C-3 are engaged as described above. By way of example, engagement of the second brake B-2 and the third clutch C-3 to establish first reverse speed will be described here. In FIGS. 5 and 6 PB1 denotes a control command for the operating oil pressure to the first brake B-1, PB2 denotes a control command for the operating oil pressure to the second brake B-2, PC denotes a control command for the operating oil pressure to the third clutch C-3, Tout denotes the output torque of the output shaft 16, and Nd denotes the speed of rotation of the intermediate rotary member 18 which is linked to the second sun gear S3. The intermediate rotary member is linked with the ring gear R1 by engagement of the third clutch C-3, is linked with the carrier C1 by engagement of the fourth clutch C-4, and is fixed to the transmission case 11 by engagement of the first brake B-1.

In step 100, responsive to a signal for the neutral range (N) from the range position sensor 34, a standby pressure command is output to the brake B-1 in step 102, and the brake B-1 is operated with the standby pressure PB1. This standby pressure PB1 is the minimum possible pressure necessary for stopping the rotation resulting from drag torque of the clutch C-3, and is a significantly lower pressure than the normal braking pressure.

In step 104, a timer is set to a predetermined time (TM1) and, after lapse of time (T1) from the command for the standby pressure PB1 in step 106, a determination is made as to whether or not the predetermined time (TM1) has passed.

Here, the predetermined time TM1 is set for the purpose of waiting for the operating oil to fill the hydraulic servo of the first brake B-1, the first brake B-1 to be operated, and the rotation of the intermediate rotary member 18 to be stopped. If the elapsed time (T1) is after the predetermined time (TM1) and the determination is YES in step 106, the routine advances to step 108, and a command is generated for a sweep-down of the standby pressure PB1 at a predetermined gradient. Thus, the standby pressure PB1 which had been applied to the brake B-1 is gradually decreased along the predetermined gradient, as shown in FIG. 4.

In step 110, a determination is made as to whether or not the intermediate rotary member (drum 18) is rotating, based on the signal from the intermediate rotation detecting sensor 33. If the determination is YES (a determination that the intermediate rotary member 18 is rotating), the routine advances to step 112, a command is output to gradually increase the standby pressure PB1, and in the next step 114, a determination is made as to whether or not the rotation of the intermediate rotary member (drum 18) has stopped. If the determination in step 114 is YES (a determination that the intermediate rotary member 18 has stopped), a command is output to stop the increase of the standby pressure PB1, and to maintain, as a constant pressure, that pressure PBI at the point in time at which the rotation of the intermediate rotary member (drum 18) stopped.

Thus, the rotation of those friction engaging elements of the third and fourth clutches C-3 and C-4 which are rotated by the drag torque, and the rotation of the intermediate rotary member (drum 18) are stopped, and if in neutral, the intermediate rotary member (drum 18) is held stopped.

However, if the determination in step 110 is NO (a determination that the intermediate rotary member 18 is not rotating), the routine returns to step 108, and the sweep-down is continued. On the other hand, if the determination in step 114 is NO (a determination that the intermediate rotary member 18 has not stopped), the routine returns to step 112. Accordingly, sweep-down of the operating pressure of the first brake B-1 is continued until it is determined in step 108 that the intermediate rotary member 18 is rotating, and sweep-up is performed until the intermediate rotary member 18 rotates at the PBI constant pressure in step 116, and by so doing, the oil pressure of the first brake B-1 can be controlled at the lowest possible oil pressure needed to stop the rotation of the intermediate rotary member 18.

Holding of the constant standby pressure PB1 in step 116 is continued until the reverse range (R) is determined in step 120. In other words, upon reverse range (R) being determined based on the signal from the range position sensor 34, the standby pressure is reduced to 0 in step 122, and in the next step 124, a control command is output to engage the second brake B-2, as required to establish the reverse range (R), and the second brake B-2 becomes engaged at a predetermined brake pressure. In this case, the rotation of the clutch C-3 is stopped by the drag torque, whereby one, stopped set of the friction engaging elements of the brake B-2 can engage with the other, interleafed set of friction engaging elements. Accordingly, there is no change in rotation of the rotary elements within the planetary gear set 21, and thus no shock occurs when the brake is engaged, and the output torque Tout does not change.

When the control command is output to engage the second brake B-2 in shifting into reverse, a timer is set to a predetermined time (TM2) in the following step 126, and in step 128 a determination is made as to whether or not the time elapsed (T2) since output of the command signal for engagement of brake B-2 has surpassed the predetermined time (TM2). If the elapsed time (T2) has surpassed the predetermined time (TM2) and the determination result is YES, the routine advances to step 130, and a predetermined control command for engagement of the third clutch C-3 is issued. Thus, the third clutch C-3 is engaged with pressure increased along a smooth gradient which does not generate engaging shock. By waiting the predetermined time TM2 in step 128, simultaneous engagement of the second brake B-2 and the third clutch C-3 and the resulting speed shift shock can be avoided. Thus, by engaging the brake B-2 and the clutch C-3, reverse can be established (step 132), and the routine is ended. As shown in FIG. 4, responsive to output of the reverse command, a drain command for draining the operating oil from the servo of the first brake B-1 and a supply command for supplying the operating oil to the servo of the second brake B-2 are output for simultaneous execution. However in actuality, the hydraulic servo of the second brake B-2 is not immediately filled with operating oil, but rather is filled with operating oil after a delay after the command. Since the operating oil of the first brake B-1 is drained during this delay, a tie-up does not actually occur.

Also as shown in FIG. 4, the speed of rotation Nd of the intermediate rotary member 18 remains 0 during the engagement of the third clutch C-3. By movement of the shift lever from the neutral range to the reverse range while the vehicle is stopped, and the output shaft 16 is fixed by the vehicle brake, and thus the ring gear R2 is fixed. Accordingly, by the engagement of the second brake B-2 in this state, all of the rotary elements of the planetary gear set are fixed.

In the above-described embodiment, the first brake B-1 is operated while in neutral to stop the rotation of the intermediate member 18 due to drag torque. Thus, when shifting to reverse and so forth, the second brake B-2 can be engaged while the intermediate rotary member 18 is stopped, so that shift shock due to engagement of the second brake B-2 can be reliably prevented, and a smooth shift can be executed without shock.

Moreover, the rotation of the intermediate rotary member 18 due to drag torque can be stopped with minimal brake pressure (standby pressure PB1), and responsive to a reverse command generated by movement of the shift lever, operating oil is supplied to the servo of brake B-2 to stop the rotation of the intermediate rotary member 18, and the time delay needed for filling to the operating pressure is establishing reverse can be minimized. Thus, in order in prevent a tie-up of the transmission mechanism, the engagement of the second brake B-2 is not delayed.

In the example described above, wherein the rotation of the intermediate rotary member (drum 18 of the third and fourth clutches C-3 and C-4) is detected by the intermediate rotation detecting sensor 33, and the pressure to the servo of the brake B-1 is gradually increased until the rotation of the intermediate rotary member 18 is stopped. Operation of the brake B-1 in neutral, with sufficient brake pressure (standby pressure PB1) to stop the rotation of the intermediate rotary member (drum 18), can also be utilized to prevent rotation of the clutch due to drag torque in neutral, with an open loop control.

While the foregoing embodiment, has been described as an automatic transmission which provides eight forward speeds and two reverse speeds, the present invention is not so limited, and rather can be applied to a wide range of automatic transmissions wherein lubricating oil is supplied from one clutch to another clutch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:
   a first brake;
   a clutch;
   a first rotary member which is continuously rotated by an engine;
   an intermediary rotary member which is connected to the first rotary member by engagement of the clutch and fixed to a transmission case by engagement of the first brake;
   wherein speed shifting between a plurality of speeds is achieved by engaging and releasing of a plurality of frictional engagement devices including at least the clutch and the first brake;
   wherein switching between a driving range and a non-driving range is responsive to operation of a shift lever;
   wherein the first brake is engaged to fix the intermediate rotary member to the transmission case in the non-driving range; and
   wherein an operating oil pressure of the first brake in the non-driving range is lower than the operating oil pressure engaging the first brake in at least one speed in the driving range.

2. The automatic transmission according to claim 1, wherein the operating oil pressure engaging the first brake in the non-driving range is the minimum oil pressure required to fix the intermediate rotary member to the transmission case.

3. The automatic transmission according to claim 2, wherein the first rotary member is an input rotary member and wherein the automatic transmission further comprises:
   an input rotation detecting sensor for detecting the rotational speed of the input rotary member;
   an output rotary member;
   an output rotation detecting sensor for detecting the rotational speed of the output rotary member; and
   a rotation detecting sensor for detecting the rotational speed of the intermediate rotary member.

4. The automatic transmission according to claim 3, wherein the plurality of frictional engagement devices further includes a second brake which is different from the first brake; and
   wherein the non-driving range is a neutral range;
   wherein the driving range is a reverse range;
   wherein, at the time of switchover from the neutral range to the reverse range, the first brake is released; and
   wherein the reverse range is established by engagement of the clutch and the second brake.

5. The automatic transmission according to claim 2, wherein the plurality of frictional engagement devices further includes a second brake which is different from said first brake; and
   wherein the non-driving range is a neutral range;
   wherein the driving range is a reverse range;
   wherein, at the time of switchover from the neutral range to the reverse range, the first brake is released; and
   wherein the reverse range is established by engagement of the clutch and the second brake.

6. The automatic transmission according to claim 1, wherein the first rotary member is an input rotary member and further comprising:
   an input rotation detecting sensor for detecting the rotational speed of the input rotary member;
   an output rotary member;

an output rotation detecting sensor for detecting the rotational speed of the output rotary member; and a rotation detecting sensor for detecting the rotational speed of the intermediate rotary member.

7. The automatic transmission according to claim 6, wherein the plurality of frictional engagement devices further includes a second brake which is different from the first brake; and wherein the non-driving range is a neutral range;

wherein the driving range is a reverse range;

wherein, at the time of switchover from neutral to the reverse range, the first brake is released; and wherein the reverse range is established by engagement of the clutch and the second brake.

8. The automatic transmission according to claim 1, wherein the plurality of frictional engagement devices further includes a second brake which is different from said first brake; and wherein the non-driving range is a neutral range;

wherein the driving range is a reverse range;

wherein, at the time of switchover from neutral to the reverse range, the first brake is released; and wherein the reverse range is established by engagement of the clutch and the second brake.

9. An automatic transmission comprising:

a first brake a clutch;

a first rotary member which is continuously rotated by an engine;

an intermediate rotary member which is connected to the first rotary member by engagement of the clutch and fixed to a transmission case by engagement of the first wherein speed shifting between a plurality of speeds is achieved by engaging and releasing of a plurality of frictional engagement devices including at least the clutch and the first brake;

wherein switching between a driving range and a non-driving range is responsive to operation of a shift lever;

wherein the first brake is engaged to fix the intermediate rotary member to the transmission case in the non-driving range;

wherein the plurality of frictional engagement elements further includes a second brake which is different from said first brake;

wherein the non-driving range is a neutral range;

wherein the driving range is a reverse range;

wherein, at the time of switchover from the neutral range to the reverse range, the first brake is released; and wherein the reverse range is established by engagement of the clutch and the second brake.

* * * * *

UNITED STATES PATENT AND TRADEMARK OFFICE
CERTIFICATE OF CORRECTION

PATENT NO. : 7,582,035 B2
APPLICATION NO. : 11/605280
DATED : September 1, 2009
INVENTOR(S) : Takeshi Ootsuki et al.

It is certified that error appears in the above-identified patent and that said Letters Patent is hereby corrected as shown below:

Column 8, line 11, (Claim 1, line 6), "intermediary" should read -- intermediate --.

Column 10, line 6, (Claim 9, line 8), "first" should read -- first brake --.

Signed and Sealed this

Twenty-fourth Day of November, 2009

David J. Kappos
*Director of the United States Patent and Trademark Office*